US009330465B2

(12) United States Patent
Schumacher

(10) Patent No.: US 9,330,465 B2
(45) Date of Patent: *May 3, 2016

(54) AUGMENTED REALITY VIRTUAL AUTOMOTIVE X-RAY HAVING SERVICE INFORMATION

(71) Applicants: Bosch Automotive Service Solutions Inc., Warren, MI (US); Robert Bosch GmbH, Stuttgart (DE)

(72) Inventor: Darren Schumacher, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,024

(22) Filed: Feb. 2, 2015

(65) Prior Publication Data

US 2015/0193924 A1 Jul. 9, 2015

Related U.S. Application Data

(63) Continuation of application No. 13/840,850, filed on Mar. 15, 2013, now Pat. No. 8,948,456.

(60) Provisional application No. 61/645,941, filed on May 11, 2012.

(51) Int. Cl.
*G06T 7/00* (2006.01)
*G06K 9/00* (2006.01)
(Continued)

(52) U.S. Cl.
CPC .............. *G06T 7/004* (2013.01); *G06F 1/1694* (2013.01); *G06F 3/011* (2013.01); *G06F 3/0304* (2013.01);
(Continued)

(58) Field of Classification Search
USPC ......... 382/103, 104, 149, 151, 152, 216, 291; 345/440, 169
See application file for complete search history.

(56) References Cited

U.S. PATENT DOCUMENTS 7,171,283 B2  1/2007  Popp et al.
7,451,028 B2  11/2008  Pillar et al.
(Continued)

FOREIGN PATENT DOCUMENTS

WO   2011151422 A1   12/2011

OTHER PUBLICATIONS

Dillow, Clay, "BMV Augmented Reality Glasses Help Average Joes Make Repairs", 2009, retrieved on Mar. 4, 2015, retrieved from internet: http://www.popsci.com/scitech/article/2009-09/bmw-developing-augmented-reality-help-mechanics.
(Continued)

Primary Examiner — Yosef Kassa
(74) Attorney, Agent, or Firm — Maginot Moore & Beck LLP

(57) ABSTRACT

A tool for providing a user with information on a particular object related to a position and an orientation of the tool with respect to the object includes an image capturing device configured to capture an image of the object. The tool further includes a position and orientation sensor configured to determine the position of the tool with respect to the object, a processor configured to determine from the image the type of object, a display configured to display the image of the object, the display further configured to display additional information in addition to the image of the object in response to the determination of the type of object, and the processor further configured to determine a change in one of the position and the orientation of the sensor and the tool and further configured to modify the display.

20 Claims, 6 Drawing Sheets

(51) Int. Cl.

| | | |
|---|---|---|
| *G09G 3/00* | (2006.01) | |
| *G06F 1/16* | (2006.01) | |
| *G06F 3/01* | (2006.01) | |
| *G06F 3/03* | (2006.01) | |
| *G06F 3/0481* | (2013.01) | |
| *G06T 19/00* | (2011.01) | |
| *G06F 3/0346* | (2013.01) | |

(52) U.S. Cl.
CPC .......... *G06F 3/0346* (2013.01); *G06F 3/04815* (2013.01); *G06K 9/00* (2013.01); *G06T 19/006* (2013.01); *G09G 3/00* (2013.01); *G06F 2200/1637* (2013.01); *G06T 2207/30244* (2013.01); *G09G 2340/12* (2013.01); *G09G 2380/10* (2013.01)

(56) References Cited

U.S. PATENT DOCUMENTS

| | | | |
|---|---|---|---|
| 7,715,962 | B2 | 5/2010 | Rowe et al. |
| 8,095,247 | B2 | 1/2012 | Pillar et al. |
| 8,255,137 | B2 | 8/2012 | Jinno et al. |
| 8,700,241 | B2 | 4/2014 | Yoshimura |
| 8,712,622 | B2 | 4/2014 | Ito et al. |
| 2009/0237546 | A1 | 9/2009 | Bloebaum et al. |

OTHER PUBLICATIONS

Palma, Maria, "YDreams Interactivity on Show at Sao Paolo's 26th International Automobile Salon", 2010, retrieved on Mar. 4, 2015, retrieved from internet: http://www.ydreams.com/blog/2010/11/02/ydreams-interactivity-on-show-at-sao-paulo%E2%80%99s-26th-international-automobile-salon/.

Mashable.com, "X-Ray App Let's Users "See Through" Models' Clothing", 2010, retrieved Mar. 4, 2015, retrieved from internet: http://mashable.com/2011/11/11/moosejaw-xray-augmented-reality-app/.

Mobilrealityapps, HomeSpotter—Augmented Reality Apps in Real Estate, by MobileRealityApps.com, 2011, retrieved Mar. 5, 2015, retrieved from internet: https://www.youtube.com/watch?v=MKQpD43HXe0.

International Search Report issued in International Application No. PCT/US2013/040231 filed May 9, 2013.

AUGMENTED REALITY VIRTUAL AUTOMOTIVE X-RAY HAVING SERVICE INFORMATION

CROSS-REFERENCE TO RELATED APPLICATIONS

This application is continuation of co-pending U.S. patent application Ser. No. 13/840,850, entitled "Augmented Reality Virtual Automotive X-Ray having Service Information" by Darren Schumacher filed on Mar. 15, 2013, which issued as U.S. Pat. No. 8,948,456 on Feb. 3, 2015, which in turn, claims the benefit of priority of U.S. provisional application Ser. No. 61/645,941, filed on May 11, 2012, the disclosures of both of the two above identified patent applications being herein incorporated by reference in their entirety.

BACKGROUND OF THE DISCLOSURE

1. Field of the Disclosure

The invention is directed to a process, system and device to provide service technicians with augmented reality service information and, in particular, augmented reality service information that provides the internal and external configurations, schematics and details of components of vehicles and the like.

2. Related Art

Currently service technicians must use hard copy diagrams or computer-based diagrams in order to schematically view various internal aspects of a vehicle for repair purposes. Currently there is no solution to provide the service technician with the ability to move a computer with respect to a vehicle and have the schematics and diagrams change in conjunction with the location of the computer with respect to the vehicle. Moreover, there is no solution to provide the service technician with the ability to move a computer with respect to a vehicle and have the schematics and diagrams change in conjunction with the location of the computer with respect to the vehicle such that they are superimposed over the vehicle image as shown in the computer.

Accordingly, there is a need for a computer that can provide schematics and diagrams in response to movement of computer with respect to a vehicle to improve the repair process.

SUMMARY OF THE INVENTION

The foregoing needs are met, to a great extent, by the invention, with a process and system for implementing a computer system to provide schematics and diagrams in response to movement of the computer.

In one aspect a tool for providing a user with information on a particular object related to a position and an orientation of the tool with respect to the object includes an image capturing device configured to capture an image of the object, a position and orientation sensor configured to determine the position of the tool with respect to the object, a processor configured to determine from the image the type of object, a display configured to display the image of the object, the display further configured to display additional information in addition to the image of the object in response to the determination of the type of object, and the processor further configured to determine a change in one of the position and the orientation of the sensor and the tool and further configured to modify the display to display additional information in addition to the image of the object in response to the determination of the change in one of the position and the orientation.

In a further aspect, a process for operating a tool for providing a user with information on a particular object related to a position and orientation of the tool with respect to the object includes capturing an image of the object, sensing a position and orientation to determine the position of the tool with respect to the object, determining from the image the type of object, displaying the image of the object, displaying additional information in addition to the image of the object in response to the determination of the type of object, and determining a change in one of the position and orientation of the tool and further in displaying additional information in addition to the image of the object in response to the determination of the change in one of position and orientation.

In yet another aspect, a tangible storage medium device storing computer executable instructions for a tool for providing a user with information on a particular object related to a position and orientation of the tool with respect to the object includes instructions for capturing an image of the object, instructions for sensing a position and orientation to determine the position of the tool with respect to the object, instructions for determining from the image the type of object, instructions for displaying the image of the object, instructions for displaying additional information in addition to the image of the object in response to the determination of the type of object, and instructions for determining a change in one of the position and orientation of the tool and further in displaying additional information in addition to the image of the object in response to the determination of the change in one of position and orientation.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Figure 1:
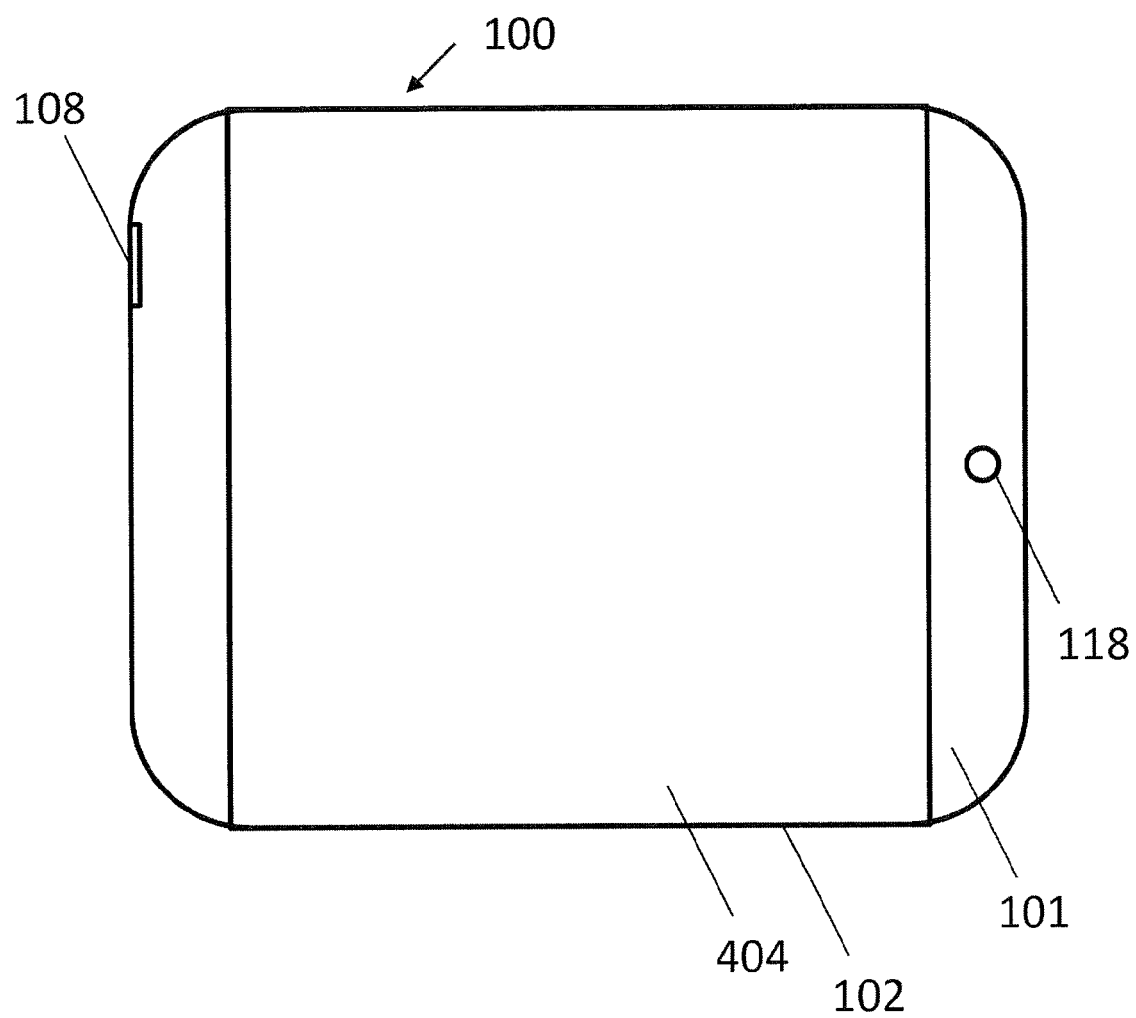
FIG. 1 shows the front side of a tool constructed in accordance with the invention.
Figure 2:
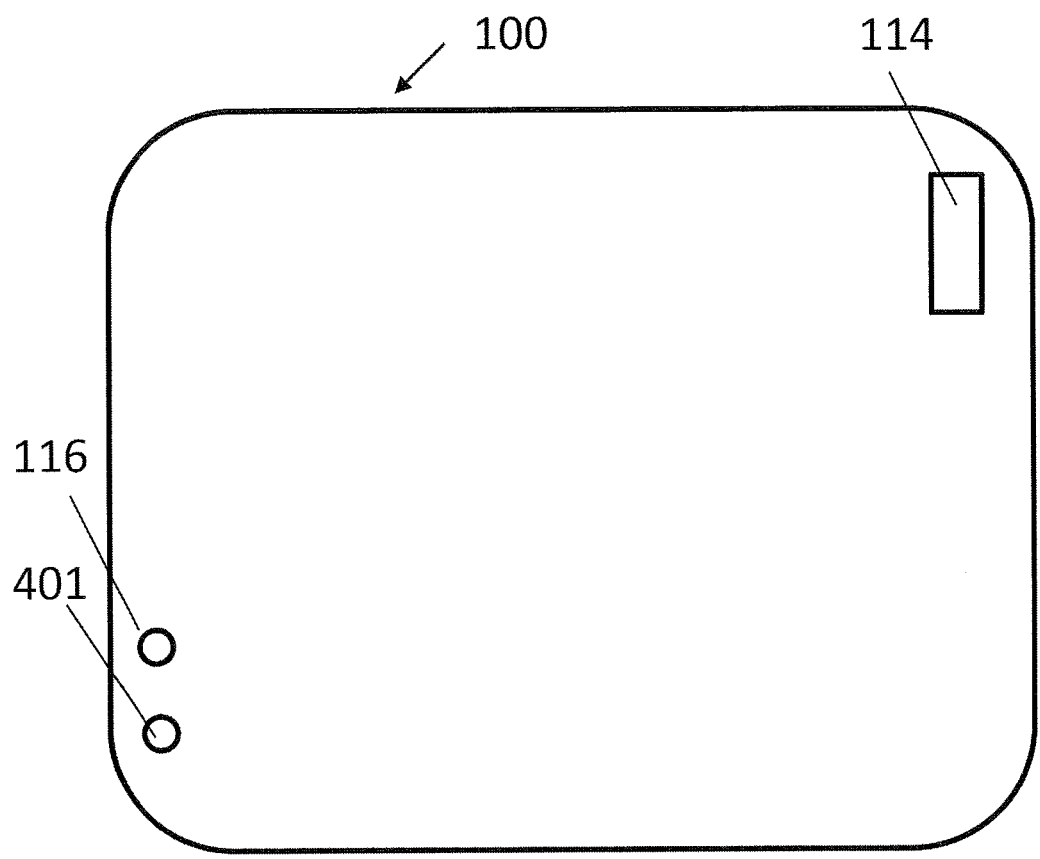
FIG. 2 shows the back side of a tool constructed in accordance with the invention.

FIG. 1 shows the front side of a tool constructed in accordance with the invention; and FIG. 2 shows the back side of a tool constructed in accordance with the invention. In particular, the tool 100 according to an aspect of the invention includes a housing 101 and a display 102. The display 102 can be any type of display including LCD, LED, VGA, OLED, SVGA and other types of displays that may include touch sensitive screen displays. The display 102 may be a colored, non-colored (e.g. gray scale) or a combination of both. The display 102 can display information such as the make, model, year of vehicles that the tool 100 can diagnose, the various diagnostic tests the tool 100 can run, diagnostic data the tool 100 has received, the baseline data of the various components in a vehicle, part images, parts information, and information from remote servers (internet, database information, etc.). Additionally, the display 102 can show videos for the technician to view and the accompanying audio can be heard via the built in speakers 114. The speakers 114 can be a single speaker or multiple speakers for stereo sound. A function button 118 may arranged on the housing 101 and provide different input functionality. Additionally, a power button 108 may arranged on the housing and may operate to turn on or turn off the tool 100. In one embodiment, the display 102 allows the technician to input selection through the touch screen for interactive navigation and selection, wherein the technician can select a menu item by touching the selection on the screen. The system may be implemented in a tool 100 as shown in FIG. 1. In particular, the tool 100 may be a personal computer, a tablet computer, a laptop, a smart phone, iPad, net book, or the like.

A camera 401 may be incorporated or coupled to the tool 100 of FIGS. 1 and 2 according to one aspect of the invention. In particular, the camera 401 records still images or video. The camera 401 includes a lens or as many as needed, and a flash 116. Lens zoom and focus features may also be included in the tool 100 and may be digitally enhanced by software on the tool 100 or the camera 401.

In one aspect, the technician can use the camera 401 to take a picture of the vehicle. An image database 412 stored on the diagnostic tool or remotely can be used to identify the vehicle by using image recognition software. The image database can contain images of the vehicle. Certain portions (identifying points and measurements) or the whole profile of the vehicle can be used to compare the vehicle to images of vehicles stored in the image database. The image recognition software may use various characteristics of the vehicle to conduct the search. These characteristics include measurements of the vehicle, surface characteristics of the vehicle, etc. Once the search identifies the vehicle, the information related to the vehicle can be displayed on a display 102 of the tool 100 for verification by the technician.

In another aspect, the technician can use the camera 401 to take a picture of a faulty part. The image database 412 stored on the diagnostic tool or remotely can be used to identify the part by using image recognition software. The image database can contain images of the parts or other information such as bar code information, etc. Certain portions (identifying points and measurements) or the whole profile of the part can be used to compare the part to images of parts of a vehicle or device stored in the parts image database. The image recognition software may use various characteristics of the part to conduct the search. These characteristics include measurements of the part, wiring, connections, color(s), contrast (part versus the background of the vehicle), surface characteristics of the part, etc.

Once the search identifies the parts and/or the vehicle, the information related to the part and/or the vehicle can be displayed on a display 102 of the tool 100 for verification by the technician. The information can include the part number, diagrams on how to remove and replace the part, diagrams on where the part is located on the vehicle, manuals for the part, specifications about the parts, warranty information, OEM (original equipment manufacturer) equivalent parts, etc. Once properly identified, additional information such as parts availability, pricing, location, etc. can be retrieved. The information can also include diagrams on the vehicle, diagrams on the vehicle, manuals for the vehicle, specifications about the vehicle, warranty information, etc.

Figure 3:
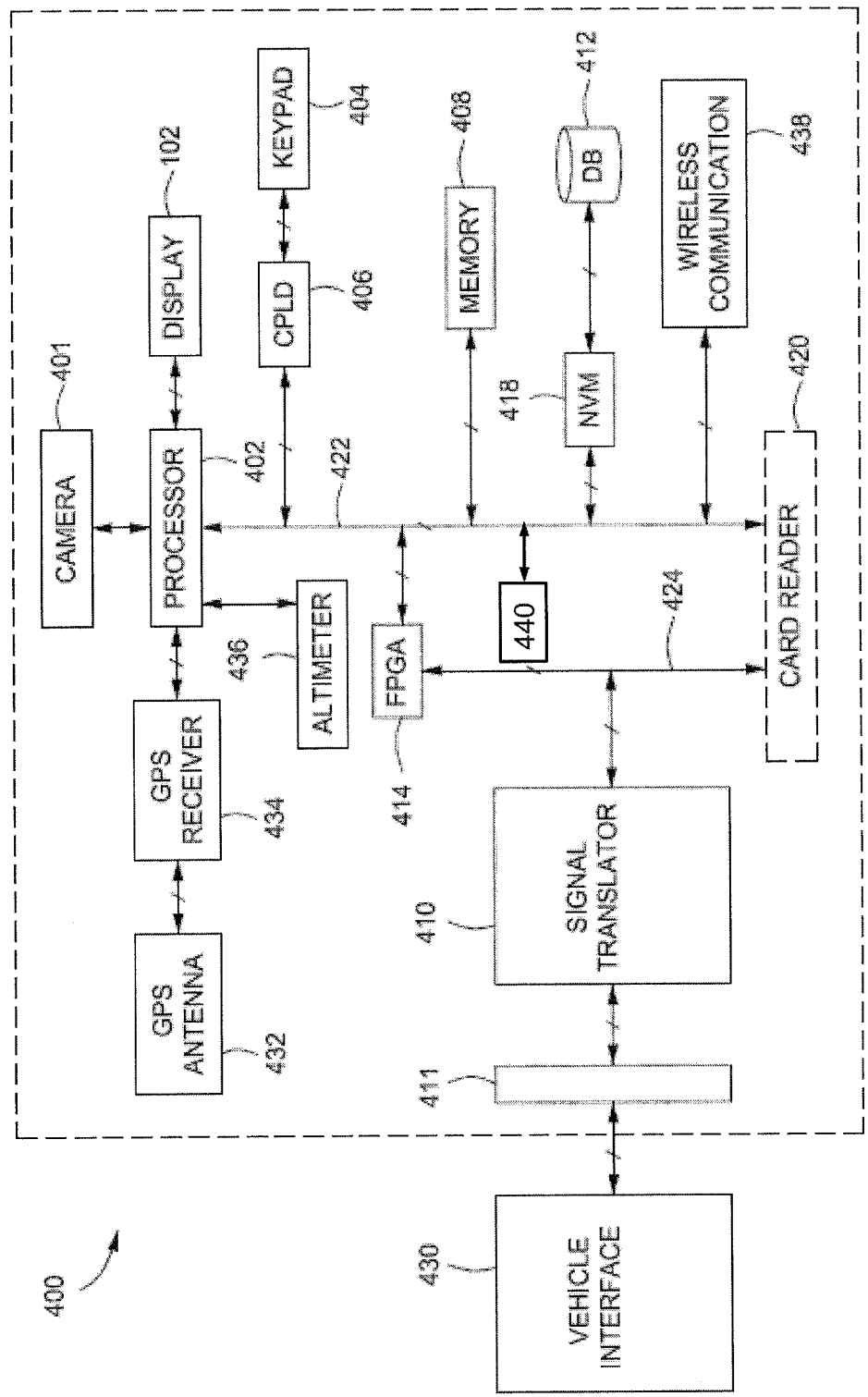
FIG. 3 is a block diagram of the components of the tool according to an aspect of the invention.

FIG. 3 is a block diagram of the components of the tool 100 according to an aspect of the invention. In FIG. 3, the tool 100 according to an aspect of the invention includes the camera 401, a processor 402, the display 102, the input device in the form of a touchscreen and/or keypad 404, a memory subsystem 408, an internal non-volatile memory (NVM) 418 having the vehicle and parts image database 412, and a wireless communication circuit 438.

The tool 100 may include a field programmable gate array (FPGA) 414, a first system bus 424, a complex programmable logic device (CPLD) 406, a card reader 420, a second system bus 422, a connector interface 411, a selectable signal translator 410, a GPS antenna 432, a GPS receiver 434, and an altimeter 436.

A vehicle communication interface 430 of the vehicle under test may be in communication with the tool 100 through a connector interface 211 via an external cable (not shown).

The selectable signal translator 410 may communicate with the vehicle communication interface 430 through the connector interface 411. The signal translator 410 may condition signals received from an ECU unit through the vehicle communication interface 430 to a conditioned signal compatible with tool 100. The signal translator 410 can communicate with, for example, the following communication protocols: J1850 (VPM and PWM), ISO 9141-2 signal, communication collision detection (CCD) (e.g., Chrysler collision detection), data communication links (DCL), serial communication interface (SCI), Controller Area Network (CAN), Keyword 2000 (ISO 14230-4), OBD II or other communication protocols that are implemented in a vehicle.

Alternatively, the tool 100 may communicate with a vehicle utilizing wireless technology consistent with of U.S. patent application Ser. No. 13/155,961, entitled, "Cellular Phone Configured with Off-Board Device Capabilities and Starter/Charger and Battery Testing Capabilities," filed Jun.

8, 2011, now U.S. Pat. No. 8,180,515, issued on May 15, 2012, the description of which is incorporated herein by reference in its entirety.

The circuitry to translate and send in a particular communication protocol can be selected by FPGA 414 (e.g., by tri-stating unused transceivers) or by providing a keying device that plugs into the connector interface 411 that is provided by the tool 100 to connect the tool 100 to the vehicle communication interface 430. The signal translator 410 may also be coupled to FPGA 414 and the card reader 420 via the first system bus 424. FPGA 414 transmits to and receives signals (i.e., messages) from the ECU unit through signal translator 410.

The FPGA 414 may be coupled to the processor 402 through various address, data and control lines by the second system bus 422. The FPGA 414 may also be coupled to the card reader 420 through the first system bus 424. The processor 402 may be also coupled to the display 102 in order to output the desired information to the technician. The processor 402 may communicate with the CPLD 406 through the second system bus 422. Additionally, the processor 402 may be programmed to receive input from the technician through the user interface 404 via the CPLD 406. The CPLD 406 provides logic for decoding various inputs from the user of the tool 100 and also provides glue-logic for various other interfacing tasks.

The memory subsystem 408 and internal non-volatile memory 418 may be coupled to the second system bus 422, which allows for communication with the processor 402 and FPGA 414. The memory subsystem 408 can include an application dependent amount of dynamic random access memory (DRAM), a hard drive, and/or read only memory (ROM). The software to run the tool 100 can be stored in the memory 408 or 418, including any other database. The database can include diagnostic information and other information related to vehicles.

In one aspect, the vehicle and parts image database can be located on a remote computing device instead of being local on the diagnostic tool. The remote parts image database can be accessed via a wireless or wired connection. The remote vehicle and parts image database can also be stored on an external memory, such as a compact flash card or other memories and accessed locally by the diagnostic tool.

The internal non-volatile memory 418 can be an electrically erasable programmable read-only memory (EEPROM), flash ROM, or other similar memory. The internal non-volatile memory 418 can provide, for example, storage for boot code, self-diagnostics, various drivers and space for FPGA images, if desired. If less than all of the modules are implemented in FPGA 414, the memory 418 can contain downloadable images so that FPGA 414 can be reconfigured for a different group of communication protocols.

The GPS antenna 432 and GPS receiver 434 may be mounted in or on the housing 101 or any combination thereof. The GPS antenna 432 electronically couples to the GPS receiver 434 and allows the GPS receiver to communicate (detects and decodes signals) with various satellites that orbit the Earth. In one aspect, the GPS antenna and GPS receiver may be one device instead of two. The GPS receiver 434 and GPS antenna 432 may electronically couple to the processor 402, which is coupled to memory 408, NVM 418 or a memory card in the card reader 420. The memories can be used to store cartographic data, such as electronic maps. The diagnostic tool can include all the maps for the U.S. (or country of use), North America or can have the region or state where the diagnostic tool is located.

The GPS receiver communicates with and "locks on" to a certain number of satellites in order to have a "fix" on its global location. Once the location is fixed, the GPS receiver, with the help of the processor, can determine the exact location including longitude, latitude, altitude, velocity of movement and other navigational data of the tool 100.

Should the GPS receiver be unable to lock onto the minimum number of satellites to determine the altitude or unable to determine the altitude for any reason, the altimeter 436 can be used to determine the altitude of the tool 100. The altimeter 436 is electronically coupled to the processor 402 and can provide the altitude or elevation of the tool 100. The altimeter 436 can be coupled to a barometric pressure sensor (not shown) in order to calibrate the elevation measurements determined by the altimeter. The sensor can be positioned interior or exterior to the housing 101 of the tool 100. Minor atmospheric pressure changes can affect the accuracy of the altimeter, thus, the diagnostic tool can correct for these changes by using the sensor in conjunction with the altimeter along with a correction factor known in the art.

The communication circuit 438 may communicate with the processor 402 via the second bus system 422. The wireless communication circuit can be configured to communicate via RF (radio frequency), satellites, cellular phones (analog or digital), Bluetooth®, Wi-Fi, Infrared, Zigby, Local Area Networks (LAN), WLAN (Wireless Local Area Network), other wireless communication channels, configurations and standards or a combination thereof. The wireless communication circuit 438 allows the diagnostic tool to communicate with other devices wirelessly such as with a remote computing device having remote databases. In one embodiment, the database includes the vehicle and parts image database. The wireless communication circuit 438 may include an antenna built therein and being housed within the housing 101 or can be externally located on the housing 101.

The database 412 may contain detailed information on various vehicles. The information may include schematics, wiring systems, internal and external images, fuel systems, electronic modules and the like. The information may identify vehicles by vehicle year, vehicle model, vehicle identification number or any other identifying information. The database 412 may be stored within the tool 100, stored partially within the tool 100, and/or stored external to the tool 100 in a separate database that may be accessed via the Internet or the like as described above.

The processor 402 may execute instructions and other computer programs in order to operate the system described herein. Additionally the processor 402 may execute any other functions necessary to operate peripheral devices and other aspects not necessarily associated with the invention herein The tool 100 may further include an orientation circuit 440. The orientation circuit 440 may include an inertial sensor such as various strain gages and load transducers to determine the orientation of the tool 100. This allows the tool 100 to determine and provide an orientation, movement direction or change in both to the processor 402.

Figure 6:
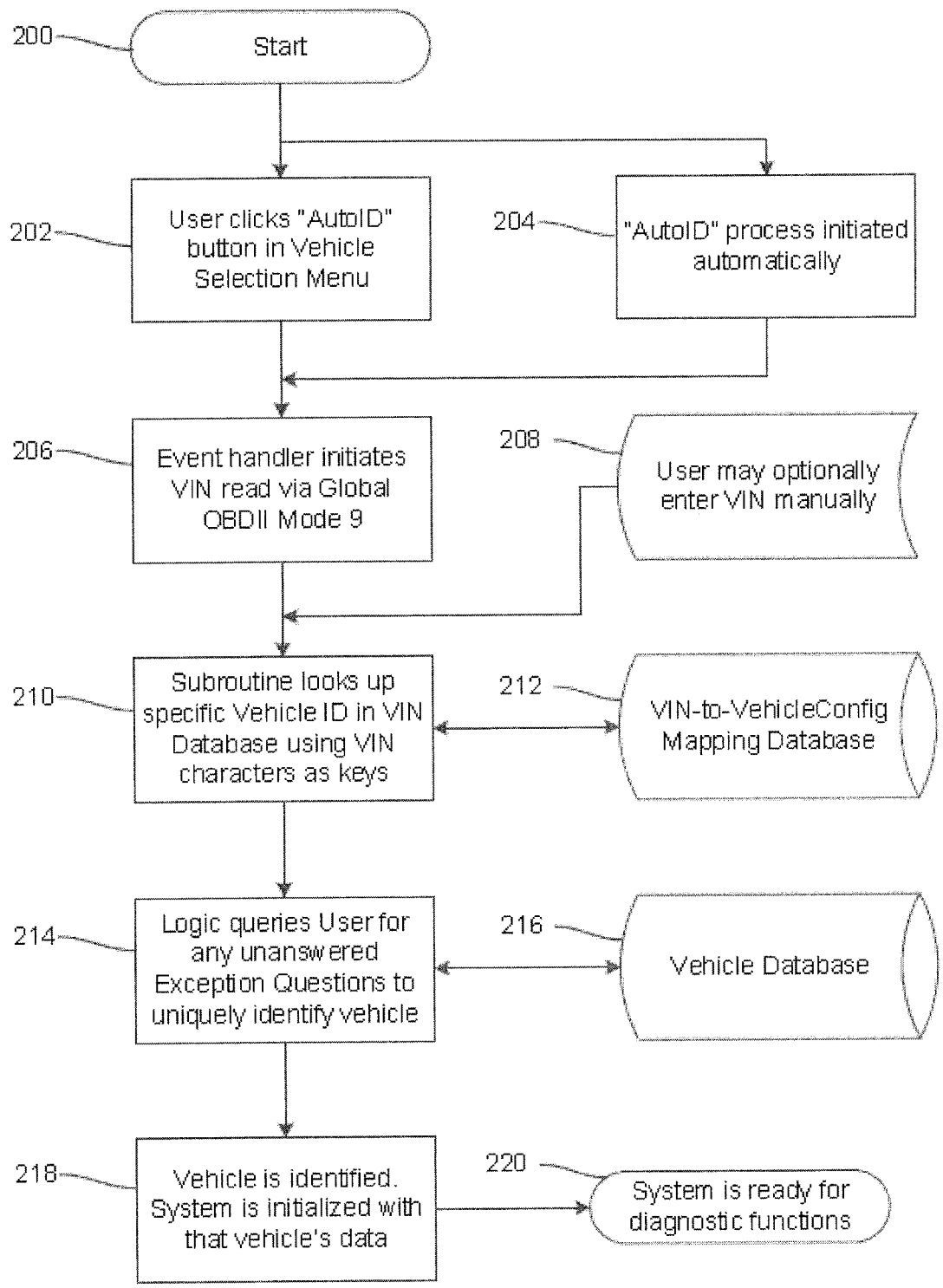
FIG. 6 shows a flow chart of a process for automating the selection of the vehicle according to an aspect of the invention.

In operation, the tool 100 may allow a service technician to select a vehicle in which to obtain information as described with respect to FIG. 6. Additionally or alternatively, the tool 100 may be able to identify the vehicle based on the vehicle's image as described above. In this regard, a camera 401 may capture an image of the vehicle, and the processor 402 may compare the image to other images that are stored in the database 412. Based on this comparison, the processor 402 may select the vehicle type in the database based on this comparison process and provide the service technician detailed schematics and the like from the database 412.

Once the vehicle is established via any of the processes described herein, detailed positioning image data within the vehicle model is possible through recognition of the field of view of the tool 100 as the technician moves the tool 100 and camera 401 around the vehicle. In other words, the image displayed by the tool 100 on the display 102 that is captured by the camera 401, such as a CCD, may move and change with the movement of the tool 100. The moving image may be based on the change in position of the outline of the vehicle image as captured by the camera 401, may be based on the orientation circuit 440 output, may be based on change a position as determined by the GPS system or may be based on other types of data. The schematic data and the like may be superimposed on the image of the vehicle on display 102 and may move on the display 102 as the image of the vehicle moves.

More specifically, a "virtual x-ray" of the vehicle can then be overlaid over the vehicle being optically captured by the camera 401 of the tool 100 and shown on the display 102. For example, a wiring subsystem, fuel system, electronic modules, or the like may be shown on display 102 based on the vehicle's geometry and service information captured within the tool 100. If the tool 100 is pointed at the quarter panel of vehicle, then the technician may choose a system(s) or subsystem(s) to view on display 102 associated with that area of the vehicle.

Figure 4:
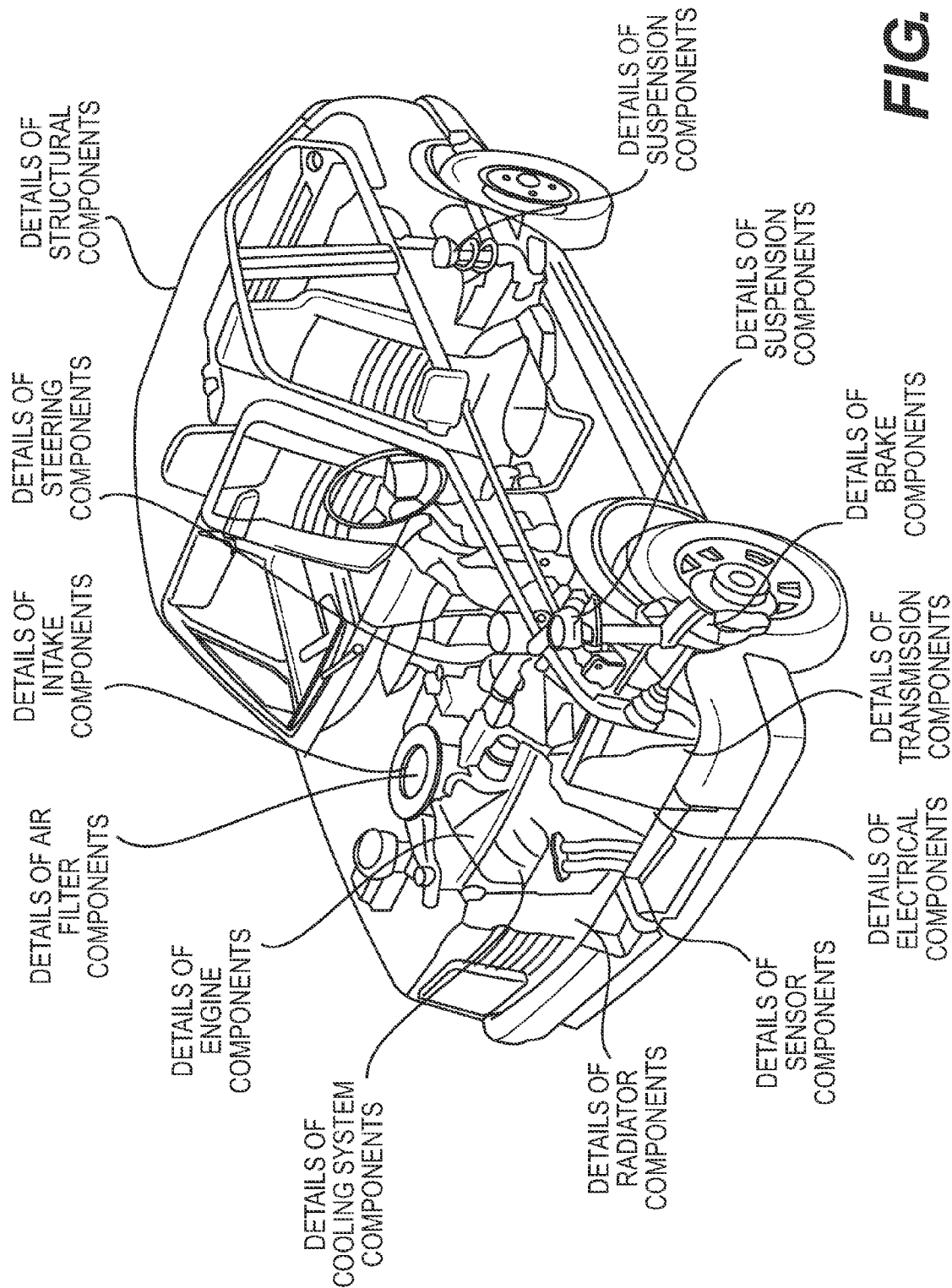
FIG. 4 shows an exemplary display of the internal components of the vehicle as displayed by an aspect of the invention.

For purposes of explanation only, one possible embodiment of the technology would display information such as shown in FIG. 4 when pointed at a vehicle. This information would change dynamically as the operator of the tool 100 moved the camera 401 around, above, below or inside the vehicle, changing the camera 401 view above and the associated recognized views and augmenting associated information types.

The technician can then identify various components or systems by using the touch screen input 104 of the display 102 (or other input method) to identify a particular subsystem, to zoom in or out, to freeze a picture etc. Different navigational approaches could be used to restrict or navigate information, for example the display 102 may display categorized informational types in different layers or views such as wiring harness routing information, electrical component location, mechanical component location and/or special operation, location of liquids reservoirs, other practical combinations of systems and sub-systems, or the like. Combinations of electrical, textual, mechanical and diagnostic information could be designed to appear as groups based on functional end-users needs such as diagnosis, maintenance or inspection.

Information related to this chosen component or subsystem, parts information, etc. can then be displayed on the display 102 of the tool 100 based on the information desired by the technician. Possible information for display on display 102 could include, but would not be limited to: part information, service time hours, part cost, related DTCs, wiring diagrams, special tools available, Technical Service Bulletins, how to repair videos, etc.

The system may also incorporate a method by which systems, components or information types could be requested either via direct input, selection from a menu, natural language criteria entry or others and the system would provide locational clues as to where the tool 100 should be moved to "discover" the component or system via clear indicators such as blinking directional arrows, or a shift to a 3D representation of the complete vehicle with augmented location arrows or descriptive information. Once relocated, the normal augmented functionality would be redisplayed and further refined through input by the technician at the appropriate location. Furthermore, not only static, database information could be used to augment the vehicle views, but dynamic vehicle content (active diagnostic codes, RPMs, sensor parameters) may be used to augment the view via interaction with on-board or off-board diagnostic systems.

Note that part information may then be linked to part ordering or sales. Individual components located could be selected and augmented to display serviceable, orderable components of the spare parts system and via drag-and-drop, swipe or other selection criteria be moved into an order basket on the display 102 of the tool 100.

In a preferred embodiment, diagnostic information from the vehicle, such as diagnostic trouble codes or odometer information may be used to automatically highlight components/systems requiring attention/maintenance, providing augmented procedural information for carrying out maintenance processes or providing links to detailed procedures or traditional manual-based service content.

Figure 5:
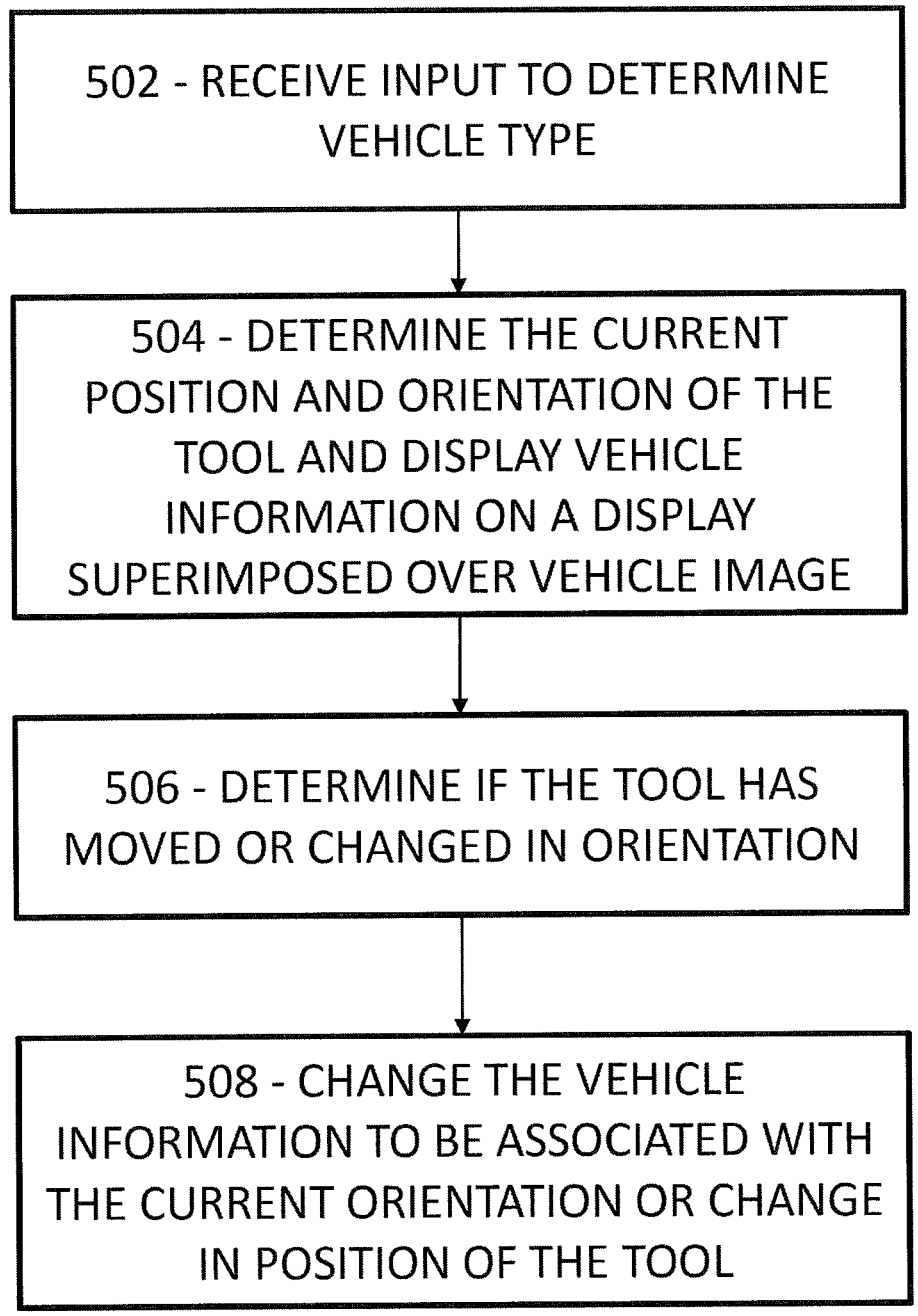
FIG. 5 shows a flow chart of a process of displaying vehicle related data images according to an aspect of the invention.

FIG. 5 shows a flow chart of a process of displaying vehicle related data according to an aspect of the invention. As a particular example, the tool 100 may execute the following process 500:

Receive input to determine vehicle type 502. If the input is hand based, receive a vehicle year, vehicle model, vehicle notification number other identifying information from the technician. If the input is a vehicle image, capture the image with the camera 401 and compare the image to the images in the database 412 to determine the vehicle or provide the service technician with a vehicle selection or a listing of possible vehicles. If the input is via vehicle connector interface, query the vehicle computer system to determine vehicle type and provide the selection to the service technician. If the resulting input is limited to a single vehicle, display vehicle image and data information on display 102. If the resulting input is directed to a plurality of vehicles, provide a listing of the plurality of vehicles on display 102 for selection by the service technician.

Determine the current position and orientation of the tool 100 and display vehicle information on display 102 superimposed over vehicle image 504. The information may include schematics, wiring systems, internal and external images, fuel systems, electronic modules and the like.

Determine if the tool 100 has moved or changed in orientation 506 as described above. In particular, the tool 100 may use the camera 401, the GPS system 432, 434, and/or the inertial sensor 440 to determine movement or a change in orientation of the tool 100.

Change the vehicle information associated with the orientation or change in position 508 of the tool 100. In this regard, the information changes, changes position, changes orientation, and/or moves in association with a change in position or orientation of the tool 100.

FIG. 6 shows a flow chart of a process for automating the selection of the vehicle according to an aspect of the invention. In FIG. 6 there is shown a flow chart of a process for automating the selection of the vehicle and ECUs being serviced by a technician. It is noted that the selection of the vehicle includes selection of such information as the make, model and year of the vehicle as well as vehicle specific equipment such as engine type, transmission type, airbags, anti-lock brakes, etc. After the tool 100 is started 200, and if so configured, the tool 100 may automatically start the vehicle identification process (AutoID process) 202. Alternatively, the AutoID process may be started upon the occurrence of some predetermined event such as, for example, connecting the tool 100 to the OBDII connector. If the tool 100 is not configured to launch the AutoID process automatically on the occurrence of some event, such as turning on the tool 100 or connecting the tool 100 to the OBDII, the technician may manually initiate the AutoID process 204 by scrolling to the AutoID process option in a vehicle selection menu using the user interface.

Whether automatically initiated 202 or selected by the technician, the first step of the AutoID process 206 is for the event handler of the tool 100 to initiate a read of the vehicle identification number (VIN) as stored on the ECU. This read of the VIN number can be accomplished, for example, using the global OBDII mode 9 functionality. Alternatively, for vehicles that do not include the global OBDII mode 9 functionality, the technician may enter the VIN number manually 208.

Following the entry of the VIN number, either automatically 206 or manually 208, the subroutine 210 of the AutoID process looks up the vehicle in a VIN to vehicle configuration mapping database 212 associated with the database 412. In addition to the VIN number, information that can be obtained by this subroutine 210 using the global OBDII mode 9 functionality includes calibration identification information as well as vehicle in-use performance information. Examples of such information includes engine type, transmission type, engine tuning specification, etc. It should be readily understood by those skilled in the art that databases, such as the VIN to vehicle configuration mapping database 212 associated with the database 412, can be accessed by the tool 100 over the internet through a wired connection to the data port or connector interface or, alternatively through a wireless device.

It may not be possible to determine the full set of required vehicle selection information from the information acquired by the subroutine 210 of the AutoID process and thus, it may be necessary for the technician to manually input additional information 214. Alternatively, additional automated searching of the system for vehicle identification information may also be performed as part of the AutoID process. The manual entry of additional information 214 or alternative additional automated searching may be facilitated by referral of the system to internal or external vehicle database 216 associated with the database 412.

Accordingly, the invention provides a process, system and device to provide service technicians with augmented reality service information and, in particular, augmented reality service information that provides the internal and external configurations, schematics and details of components of vehicles and the like. Furthermore, it is noted that as described above the invention is implemented with respect to vehicles. However, the invention is equally applicable to the medical field and providing information to a physician on the care of a patient. Additionally, the invention is equally applicable to other types of devices that may require a technician to diagnose and/or repair other devices including power tools, appliances, or the like.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, and/or the like, and/or a combination of two or more thereof.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A tool for providing a user with information on a particular object related to a position and an orientation of the tool with respect to the object comprising:
    a position and orientation sensor configured to determine the position of the tool with respect to the object;
    a processor configured to determine from a captured image the type of object;
    a display configured to display the captured image of the object;
    the display further configured to display additional information in addition to the captured image of the object in response to the determination of the type of object; and
    the processor further configured to determine a change in one of the position and the orientation of the sensor and the tool and further configured to modify the display to display additional information in addition to the captured image of the object in response to the determination of the change in one of the position and the orientation.

2. The tool according to claim 1 wherein the processor is further configured to at least one of receive diagnostic information from the object and conduct diagnostic tests on the object.

3. The tool according to claim 1 wherein the processor is further configured to determine the type of object based on at least one of information received from the object, and information received from the user about the object.

4. The tool according to claim 1 wherein the position and orientation sensor comprises one of a camera, a GPS device, and an inertial sensor.

5. The tool according to claim 1 wherein the object comprises a vehicle and wherein the additional information comprises at least one of schematics, wiring systems diagrams, internal images, and external images.

6. The tool according to claim 1 wherein the object comprises one of a patient, a power tool, and an appliance.

7. The tool according to claim 1, wherein the processor is further configured to determine from the captured image the type of object using image recognition software.

8. The tool according to claim 7, wherein the object comprises a vehicular part.

9. The tool according to claim 8, wherein the additional information comprises:
information on how to remove the vehicular part from a vehicle.

10. The tool according to claim 1, further comprising:
a connector interface configurable to communicate with a communication interface of the object; and
a signal translator operably connected to the connector interface, the signal translator configured to translate a signal from the object to a signal compatible with the tool.

11. The tool according to claim 1, further comprising:
a wireless transceiver configurable to communicate with a communication interface of the object; and
a signal translator operably connected to the wireless transceiver, the signal translator configured to translate a signal from the object to a signal compatible with the tool.

12. A tool for providing a user with information on an object, comprising:
a position and orientation sensor configured to generate data associated with a position of the tool with respect to the object;
a display;
a memory including program instructions stored therein; and
a processor operably connected to the position and orientation sensor, the display, and the memory, and configured to execute the program instructions to
determine from a captured image the type of object
control the display to display the captured image of the object,
control the display to display first additional information in addition to the captured image of the object in response to the determination of the type of object,
determine a change in one of the position and an orientation of the sensor and the tool using the generated data, and
modify the display to display second additional information in response to the determination of the change in one of the position and the orientation.

13. The tool according to claim 12 wherein the processor is further configured to at least one of receive diagnostic information from the object and conduct diagnostic tests on the object.

14. The tool according to claim 12 wherein the processor is further configured to determine the type of object based on at least one of information received from the object, and information received from the user about the object.

15. The tool according to claim 12 wherein the object comprises a vehicle and wherein the second additional information comprises at least one of a schematic, a wiring systems diagram, an internal image, and an external image.

16. The tool according to claim 12, wherein the processor is further configured to determine from the captured image the type of object using image recognition software.

17. The tool according to claim 16, wherein the object comprises a vehicular part.

18. The tool according to claim 17, wherein the second additional information comprises:
information on how to remove the vehicular part from a vehicle.

19. The tool according to claim 12, further comprising:
a connector interface configurable to communicate with a communication interface of the object; and
a signal translator operably connected to the connector interface, the signal translator configured to translate a signal from the object to a signal compatible with the tool.

20. The tool according to claim 12, further comprising:
a wireless transceiver configurable to communicate with a communication interface of the object; and
a signal translator operably connected to the wireless transceiver, the signal translator configured to translate a signal from the object to a signal compatible with the tool.

* * * * *